(12) United States Patent
Cho et al.

(10) Patent No.: US 10,509,547 B2
(45) Date of Patent: Dec. 17, 2019

(54) ELECTRONIC DEVICE AND METHOD FOR CONTROLLING A DISPLAY

(71) Applicant: Samsung Electronics Co., Ltd., Suwon-si, Gyeonggi-do (KR)

(72) Inventors: Han-Ju Cho, Seoul (KR); Dong-Jun Shin, Seoul (KR); Doo-Suk Kang, Suwon-si (KR); Ji-Eun Yang, Busan (KR); Eun-Ju Lee, Seoul (KR); Jae-Seok Joo, Seongnam-si (KR); In-Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1017 days.

(21) Appl. No.: 14/974,481

(22) Filed: Dec. 18, 2015

(65) Prior Publication Data

US 2016/0179341 A1    Jun. 23, 2016

(30) Foreign Application Priority Data

Dec. 18, 2014 (KR) ........................ 10-2014-0183197

(51) Int. Cl.
*G06F 3/0484* (2013.01)
*G06F 3/0481* (2013.01)
*G06F 3/0482* (2013.01)
*G06F 3/0488* (2013.01)
*G06F 3/0486* (2013.01)
(Continued)

(52) U.S. Cl.
CPC .......... *G06F 3/0484* (2013.01); *G06F 3/0482* (2013.01); *G06F 3/0486* (2013.01); *G06F 3/04817* (2013.01); *G06F 3/04886* (2013.01); *G06F 16/438* (2019.01); *G06F 8/38* (2013.01); (Continued)

(58) Field of Classification Search
CPC ............... G06F 3/0482; G06F 3/04817; G06F 3/04842; G06F 3/04847; G06F 3/0484; G06F 2203/04803; G06F 3/0486; G06F 3/04886
See application file for complete search history.

(56) References Cited

U.S. PATENT DOCUMENTS 5,742,778 A * 4/1998 Hao ........................ G06F 3/038
 715/759
6,072,486 A * 6/2000 Sheldon ................ G06F 3/0481
 715/835
(Continued)

FOREIGN PATENT DOCUMENTS

| CN | 101271404 A | 9/2008 |
|---|---|---|
| CN | 102945115 A | 2/2013 |

(Continued)

OTHER PUBLICATIONS

Chinese Office Action dated Oct. 9, 2019, issued in Chinese Patent Application No. 201580069356.3.

*Primary Examiner* — Nicholas Ulrich
(74) *Attorney, Agent, or Firm* — Jefferson IP Law, LLP

(57) ABSTRACT

Electronic devices and methods for controlling a display are provided. The method includes extracting at least one function applicable to at least two applications displayed on a display, displaying the extracted at least one function as an icon, and applying a function corresponding to the displayed icon to at least one application of the at least two applications, corresponding to selection of the displayed icon.

34 Claims, 12 Drawing Sheets

(51) Int. Cl.
  *G06F 16/438* (2019.01)
  *G06F 9/451* (2018.01)
  *G06F 8/38* (2018.01)

(52) U.S. Cl.
  CPC .... *G06F 9/453* (2018.02); *G06F 2203/04803* (2013.01)

(56) References Cited

U.S. PATENT DOCUMENTS

| | | | |
|---|---|---|---|
| 6,229,539 B1* | 5/2001 | Morcos | G06F 9/451 715/808 |
| 7,624,351 B2* | 11/2009 | Unger | G06F 3/0481 715/762 |
| 7,665,031 B2* | 2/2010 | Matthews | G06F 3/0481 715/779 |
| 2007/0252822 A1 | 11/2007 | Kim et al. | |
| 2008/0235615 A1 | 9/2008 | Lee | |
| 2008/0235619 A1* | 9/2008 | Lee | G06F 3/0481 715/804 |
| 2010/0248788 A1 | 9/2010 | Yook et al. | |
| 2011/0296346 A1* | 12/2011 | Chen | G06F 3/04817 715/811 |
| 2012/0117470 A1* | 5/2012 | Michelstein | G06F 3/0482 715/709 |
| 2012/0151400 A1* | 6/2012 | Hong | G06F 3/04817 715/769 |
| 2012/0176322 A1 | 7/2012 | Karmi et al. | |
| 2013/0332881 A1 | 12/2013 | Yook et al. | |
| 2014/0075394 A1* | 3/2014 | Nawle | H04M 1/72519 715/863 |
| 2014/0089833 A1 | 3/2014 | Hwang et al. | |
| 2014/0096053 A1 | 4/2014 | Lee et al. | |
| 2014/0157163 A1 | 6/2014 | Strutin-Belinoff et al. | |
| 2014/0181724 A1 | 6/2014 | Kim | |
| 2014/0313143 A1 | 10/2014 | Jung et al. | |
| 2014/0325428 A1 | 10/2014 | Lee et al. | |

FOREIGN PATENT DOCUMENTS

| | | |
|---|---|---|
| CN | 103716453 A | 4/2014 |
| CN | 104090736 A | 10/2014 |
| CN | 104111772 A | 10/2014 |
| CN | 104125332 A | 10/2014 |
| KR | 10-2013-0143333 A | 12/2013 |
| KR | 10-2014-0039575 A | 4/2014 |

* cited by examiner

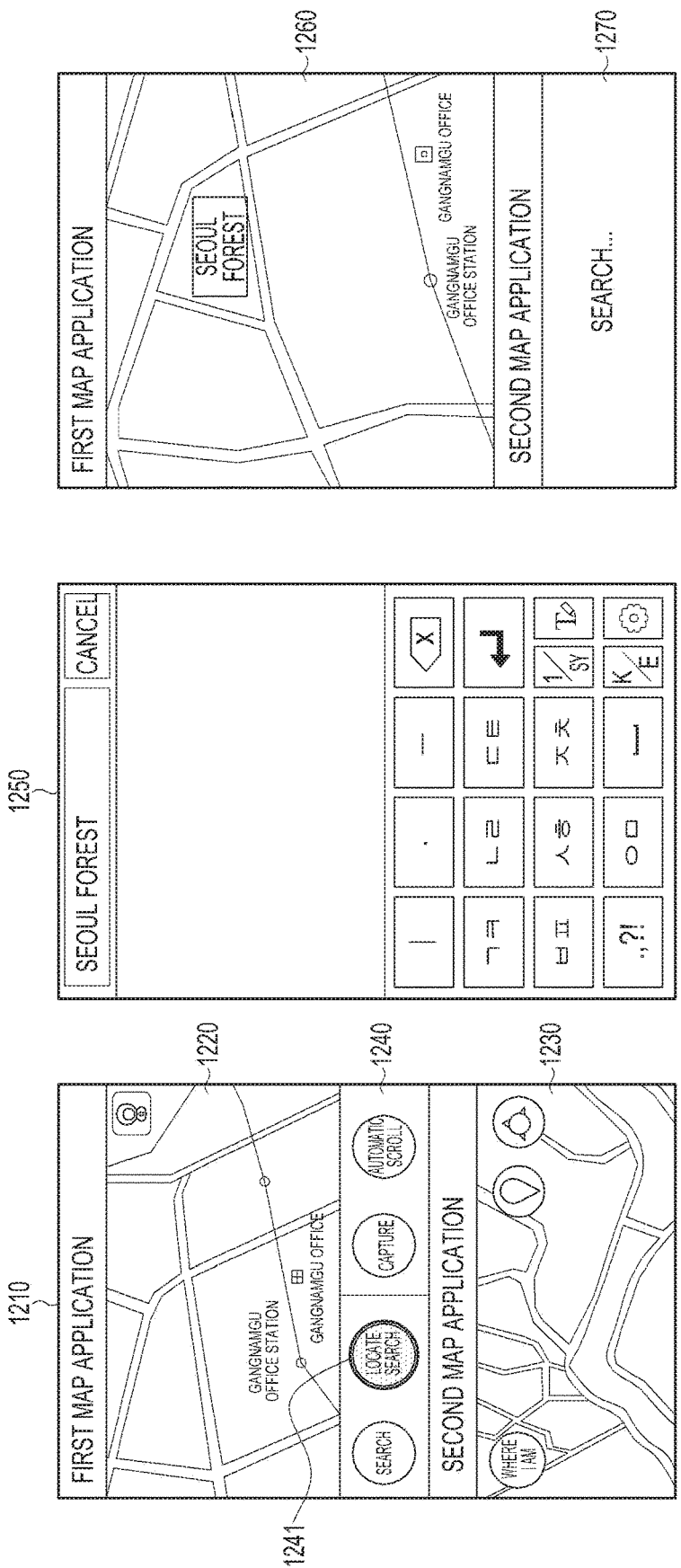

ELECTRONIC DEVICE AND METHOD FOR CONTROLLING A DISPLAY

CROSS-REFERENCE TO RELATED APPLICATION(S)

This application claims the benefit under 35 U.S.C. § 119(a) of a Korean patent application filed on Dec. 18, 2014 in the Korean Intellectual Property Office and assigned Serial number 10-2014-0183197, the entire disclosure of which is hereby incorporated by reference.

TECHNICAL FIELD

The present disclosure relates to electronic device and method for controlling a display of the electronic device.

BACKGROUND

Recently, portable electronic devices are providing a variety of services and additional functions. Various applications runnable on electronic devices are being developed to meet the demand of users and to raise the utility of electronic devices. Hence, smartphones, mobile phones, laptop computers, tablet personal computers (PCs), and other state-of-art mobile electronic devices with a display are now capable of storing hundreds of applications.

The display of the electronic device is steadily increasing to display such applications and is frequently encountered with situations where at least two applications need to be used on the display simultaneously. Furthermore, more and more users are carrying two or more electronic devices at the same time, and so, there is increasing demand for controlling multiple electronic devices.

Therefore, a need exists for easier control of multiple applications on display.

Electronic devices of the related art need to repeat the process of selecting and running an application to perform a particular function while a plurality of applications are on display to achieve multitasking.

To run a function on another application instead of the current application, the other application needs to be selected after the current application stops operation. Such a process causes user inconvenience. To address such issue, a plurality of applications are required to be simultaneously controlled.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide electronic device and method for controlling a display of the electronic device.

In accordance with an aspect of the present disclosure, a method for controlling a display of an electronic device is provided. The method includes extracting at least one function applicable to at least two applications displayed on a display, displaying the extracted at least one function as an icon, and applying a function corresponding to the displayed icon to at least one application of the at least two applications, corresponding to selection of the displayed icon.

In accordance with another aspect of the present disclosure, an electronic device for controlling a display is provided. The electronic device includes a display configured to display at least two applications and a controller configured to extract at least one function applicable to at least two applications displayed, display the extracted at least one function as an icon on the display, and apply a function corresponding to the displayed icon to at least one application of the at least two applications, corresponding to selection of the displayed icon.

In accordance with another aspect of the present disclosure, a computer-readable storage medium storing a program including a command to control a display of an electronic device is provided. The program includes instructions to perform a method that includes extracting at least one function applicable to at least two applications displayed on a display, displaying the extracted at least one function as an icon, and applying a function corresponding to the displayed icon to at least one application of the at least two applications, corresponding to selection of the displayed icon.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 12A is a view illustrating an example of displaying two applications of the same type according to an embodiment of the present disclosure;

FIG. 12B is a view illustrating an example of a screen of receiving information by applications of the same type according to an embodiment of the present disclosure; and FIG. 12C is a view illustrating an example of displaying a result searched corresponding to inputted information according to an embodiment of the present disclosure.

Throughout the drawings, like reference numerals will be understood to refer to like parts, components, and structures.

DETAILED DESCRIPTION

Figure 1:
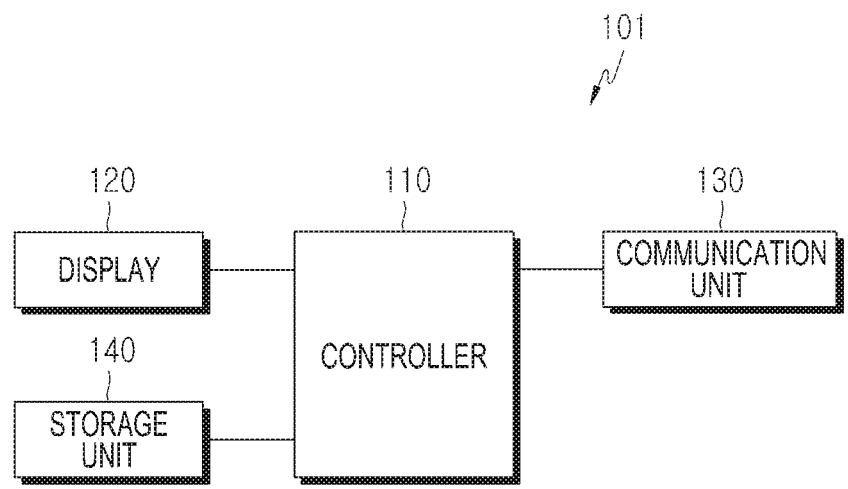
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The terms "comprise" and/or "comprising" as herein used specify the presence of disclosed functions, operations, or components, but do not preclude the presence or addition of one or more other functions, operations, or components. It will be further understood that the terms "comprise" and/or "have," when used in this specification, specify the presence of stated features, integers, operations, elements, and/or components, but do not preclude the presence or addition of one or more other features, integers, operations, elements, components, and/or groups thereof.

As used herein, the term "and/or" includes any and all combinations of one or more of the above-listed items. For examples, "A or B" may include A, or include B, or include both A and B.

Ordinal numbers as herein used, such as "first", "second", etc., may modify various components of various embodiments of the present disclosure, but do not limit those components. For example, these terms do not limit the order and/or importance of the components. These terms are only used to distinguish one component from another. For example, a first user device and a second user device are different user devices from each other. A first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween.

Unless otherwise defined, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

According to an embodiment of the present disclosure, an electronic device as disclosed herein may be a device with a display control function. Examples of the electronic device may include, but are not limited to, a smartphone, a tablet personal computer (PC), a mobile phone, a video phone, an e-book reader, a desktop PC, a laptop computer, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, or a wearable device (e.g., a head-mounted device (HMD), electronic clothes, an electronic bracelet, an electronic necklace, an electronic appcessory, an electronic tattoo, or a smart watch).

According to an embodiment of the present disclosure, the electronic device may be a smart home appliance with a display control function. Examples of the smart home appliance may include, but are not limited to, a television (TV), a digital versatile disc (DVD) player, an audio player, a refrigerator, an air conditioner, a vacuum cleaner, an oven, a microwave oven, a washer, a dryer, an air cleaner, a set-top box, a TV box (e.g., a device capable of outputting broadcast signals), a gaming console, an electronic dictionary, a camcorder, or an electronic picture frame.

According to an embodiment of the present disclosure, examples of the electronic device may include, but are not limited to, various medical devices (e.g., magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, an sailing electronic device (e.g., a sailing navigation device, a gyroscope, or a compass), avionics, security devices, vehicular head units, industrial or home robots, automatic teller's machines (ATMs), or point of sales (POS) devices.

According to various embodiments of the present disclosure, examples of the electronic device may include, but are not limited to, part of furniture or building/structure with a display control function, an electronic board, an electronic signature receiving device, a projector, or various measurement devices (e.g., devices for measuring water, electricity, gas, or electromagnetic waves). According to an embodiment of the present disclosure, the electronic device may be one or a combination of the above-listed devices. According to an embodiment of the present disclosure, the electronic device may be a flexible device. The electronic device is not limited to the above-listed devices.

Various embodiments of the present disclosure are now described with reference to the accompanying drawings. As used herein, the term "user" may denote a human or another device using the electronic device.

FIG. 1 is a block diagram illustrating an electronic device according to an embodiment of the present disclosure.

Referring to FIG. 1, the electronic device 101 may include a controller 110, a display 120, a communication unit 130, and a storage unit 140.

According to an embodiment of the present disclosure, the electronic device may include various electronic devices that may communicate data and may transmit or receive bio information to perform an operation. The electronic device may include a smartphone, a mobile phone, a laptop computer, a door lock, an air conditioner, a washer, a note PC, a tablet PC, or a smart TV.

The storage unit 140 may store commands or data received from the controller 110, the display 120, or the communication unit 130 or commands or data generated by other components. The storage unit 140 may retain programming modules including, e.g., a kernel, middleware, an application programming interface (API), or an application. The programming modules may be configured in software, firmware, hardware or a combination of two or more thereof.

The display 120 may display various types of information (e.g., multimedia data or text data) to the user.

The communication unit 130 may interface communication between the electronic device 101 and an external electronic device. For example, the communication unit 130 may be wiredly or wirelessly connected with a network to communicate with the external electronic device. The wireless connection may be made by various radio communication protocols, including, but not limited to, Wi-Fi, Bluetooth (BT), near field communication (NFC), GPS, or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM)). The wired connection may be made by various wired communication protocols, including, but not limited to, universal serial bus (USB), high definition multimedia interface (HDMI), recommended standard 232 (RS-232), Ethernet, or plain old telephone service (POTS).

The controller 110 may process at least part of information obtained from other elements (e.g., the storage unit 140, the display 120, or the communication unit 130) and may provide the same to the user in various manners. For example, the controller 110 may control at least some functions of the electronic device 101 so that the electronic device 101 may interwork with other electronic devices.

Additional information on the controller 110 is provided through FIGS. 2 to 12 described below.

Figure 2:
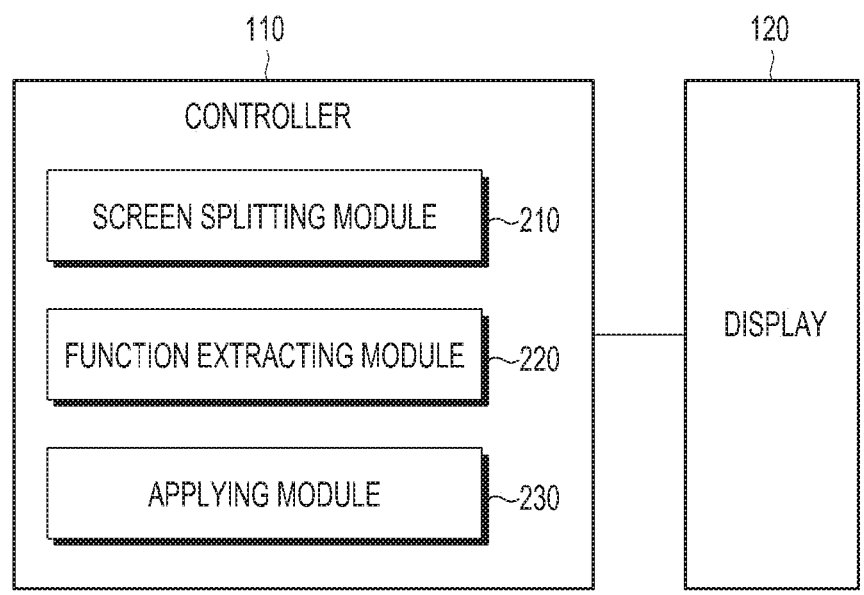
FIG. 2 is a block diagram illustrating a display and a controller of an electronic device according to an embodiment of the present disclosure.

FIG. 2 is a block diagram illustrating a display and a controller of an electronic device according to an embodiment of the present disclosure.

Referring to FIG. 2, the controller 110 may include a screen splitting module 210, a function extracting module 220, and an applying module 230.

According to an embodiment of the present disclosure, the controller 110 may control a screen displayed on the display 120. The display 120 may display one or at least two applications or may split the screen of the display 120 to fit the number of applications so that at least two applications are displayed separately. The controller 110 may extract at least one function applicable to at least two applications displayed on the display 120, display the at least one extracted function with an icon, and apply a function corresponding to the icon to at least one application corresponding to the selection of the displayed icon. The controller 110 may analyze the type of the at least applications displayed and determine at least one recommendation function (or recommended function) commonly applicable depending on the analyzed type. The controller 110 may determine at least one normal function commonly applicable regardless of the type of the at least two applications displayed.

The controller 110 may generate a window including an icon indicating the at least one recommendation function and an icon indicating the at least one normal function and may display the generated window on the display 120. The window may freely change position on the display 120. At least one icon included in the window may be relocated to the left or right by a left or right touch-and-drag. The recommendation function may include at least one of a search function for searching for data depending on the type of the at least two applications displayed, a recommendation function applicable to the at least two applications displayed, and a comparison function for comparing the at least two applications displayed. According to an embodiment of the present disclosure, the recommendation function may include other various functions commonly applicable depending on the type of applications than the above-described functions. For example, if the two applications are ones having a search function, the search function may be commonly included in the two applications. The normal function may include at least one of a capturing function for capturing the displayed applications, a scrolling function for scrolling the displayed applications, a zooming function for adjusting zoom of the displayed applications, and a printing function for printing out the displayed applications. According to an embodiment of the present disclosure, the normal function may include other various functions commonly applicable regardless of the type of applications than the above-described functions.

The controller 110 may display on the display 120 a window including the at least two applications and an icon corresponding to at least one function applicable to the applications. If any one of a plurality of icons is dragged to a first area where a first application of the at least two applications is displayed while a window including the plurality of icons is displayed, the controller 110 may apply a function corresponding to the selected icon to the first application. The controller 110 may provide a visual effect to allow the user to recognize the function-applied first application.

If the displayed icon is touched, the controller 110 may commonly apply the function corresponding to the selected icon to the at least two applications. If any icon is selected by a touch or hovering, the controller 110 may commonly apply the function corresponding to the selected icon to the at least two applications displayed on the display 120. If the displayed icon is dragged to the first area where the first application of the at least two applications is displayed, the controller 110 may control the display of the first application according to a function corresponding to the selected icon and display a result of the control on a second area where a second application of the at least two applications is displayed.

The controller 110 may include an operation of displaying on the second area data corresponding to an object included in the controlled first application, corresponding to selection of the object. The controller 110 may control the display of the first application according to the function corresponding to the selected icon. Such control may include providing a visual effect to at least one object to which a function corresponding to the selected icon may apply. If selecting the object provided with such visual effect, the controller 110 may read out data corresponding to the selected object from the storage unit 140 or download the data through another external electronic device or the Internet. The controller 110 may display such data on the second area. If an icon indicating a search function is dragged to the area where the first application is displayed, the controller 110 may apply a visual effect to at least one searchable object of a plurality of objects included in the first application.

The controller 110 may include an operation of determining the attribute of an object selected from the at least one object and displaying on the second area data corresponding to the attribute of the object. If any object is selected while a visual effect is provided to at least one object positioned in the first application, the controller 110 may determine the attribute of the selected object and display at least one data item corresponding to the determined attribute of the data on the second area where the second application is displayed. For example, if the icon having the search function is dragged to the area where the first application is positioned while a received message is displayed on the first application, the controller 110 may analyze an object searchable on the first application and provide a visual effect to the analyzed object. If the object (e.g., a person's name) provided with the visual effect is selected, data (e.g., a picture) corresponding to the selected object may be displayed on the second area. If the selected object is a web address, the controller 110 may display on the second area a web browser accessible to the web address.

If the at least two applications are applications for achieving the same purpose, the controller 110 may determine an application that displays earlier a result corresponding to the selected icon and provide a visual effect to the determined application. The determination of the application may be performed by the priority of the purpose. For example, if each application is an application capable of searching for a location, if an icon corresponding to a locating function is selected, the controller 110 may display a window to receive a location desired to be searched and may receive the location through the displayed window. If the location is input, the controller 110 may search for the locations respectively inputted through different applications capable of searching for locations.

The controller 110 may display results searched by at least two applications capable of searching for locations on the display 120 through the applications, respectively. The controller 110 may provide a visual effect to an application that shows up a search result earlier. The visual effect may include enlarging the first application that shows the search result earlier as compared with the second application. If the result searched by the second application comes earlier than the result by the first application as time goes by, the visual effect applied to the first application may be released, and a visual effect may be applied to the second application. If the name of a product desired to be purchased is input while at least two Internet shopping mall websites are displayed on the display 120, the controller 110 may determine an application that shows earlier up a result corresponding to the inputted product and may apply a visual effect to the determined application.

The determination of the application may be made depending on various conditions, including download speed, display speed, type of products, number of products, product price, and reviews on products. According to an embodiment of the present disclosure, the determination of the application may be previously designated by the user. The controller 110 may determine an application to which a visual effect is to apply by the priority according to the type or purpose of applications displayed on the display 120. The priority may be designated by the user. If two applications display the same picture, the controller 110 may find different parts between the two displayed pictures through the comparison function.

If the electronic device 101 is wiredly or wirelessly connected with at least one other electronic device positioned around, the electronic device 101 may wiredly or wirelessly obtain a screen displayed on the display of the other electronic device. In such case, the controller 110 may also display a screen obtained from the at least one other electronic device on the display 120 of the electronic device 101.

According to an embodiment of the present disclosure, the screen splitting module 210 may split the screen of the display 120 depending on the number of applications. The screen splitting module 210 may split the screen of the display 120 to display a window including at least one icon on the display 120. The screen splitting module 210 may split the screen to display on the display 120 a window including an icon indicating at least one recommendation function and an icon indicating at least one normal function. The recommendation function may include at least one of a search function for searching for data depending on the type of the at least two applications displayed, a recommendation function applicable to the at least two applications displayed, and a comparison function for comparing the at least two applications displayed. The normal function may include at least one of a capturing function for capturing the displayed applications, a scrolling function for scrolling the displayed applications, a zooming function for adjusting zoom of the displayed applications, and a printing function for printing out the displayed applications. Upon sensing an input to store in the application displaying an image, the capturing function may store the input-sensed image. The scrolling function may simultaneously scroll the at least two applications displayed. The zooming function may include a zoom-in function and a zoom-out function. The zoom-in function may simultaneously adjust the size of the at least two applications.

According to an embodiment of the present disclosure, the function extracting module 220 may extract at least one function applicable to the at least two applications displayed on the display. The function extracting module 220 may analyze the type of the at least applications displayed and determine at least one recommendation function commonly applicable depending on the analyzed type. The function extracting module 220 may determine at least one normal function commonly applicable regardless of the type of the at least two applications displayed. The function extracting module 220 may analyze the correlation between the at least two applications displayed and extract a function.

According to an embodiment of the present disclosure, the applying module 230 may apply a function corresponding to an icon displayed and selected to at least one of the at least two applications, corresponding to the selection of the icon. If a displayed icon is dragged to a first area where a first application of the at least two applications is displayed, the applying module 230 may apply a function corresponding to the selected icon to the first application. Further, if the displayed icon is touched, the applying module 230 may commonly apply the function corresponding to the selected icon to the at least two applications. If the displayed icon is dragged to the first area where the first application of the at least two applications is displayed, the applying module 230 may control the display of the first application according to a function corresponding to the selected icon and display a result of the control on a second area where a second application of the at least two applications is displayed.

The applying module 230 may display on the second area data corresponding to an object included in the controlled first application, corresponding to selection of the object. If the icon is an icon indicating a search function, the applying module 230 may apply a visual effect to at least one searchable object of a plurality of objects included in the first application. The applying module 230 may determine the attribute of an object selected from the at least one object and display on the second area data corresponding to the attribute of the object. If the selected object is a name, the applying module 230 may display on the second area at least one data item corresponding to the selected name from among the data stored in the electronic device 101. If the selected object is a web address, the applying module 230 may display on the second area a web browser accessible to the web address. If the at least two applications are applications for achieving the same purpose, the applying module 230 may determine an application that displays earlier a result corresponding to the selected icon and apply a visual effect to the determined application. The determination of application may be made depending on the priority that may differ depending on the type or purpose of applications.

Various functions respectively performed by the screen splitting module 210, the function extracting module 220, and the applying module 230 may be fulfilled by the controller 110 or a separate device.

Figure 3:
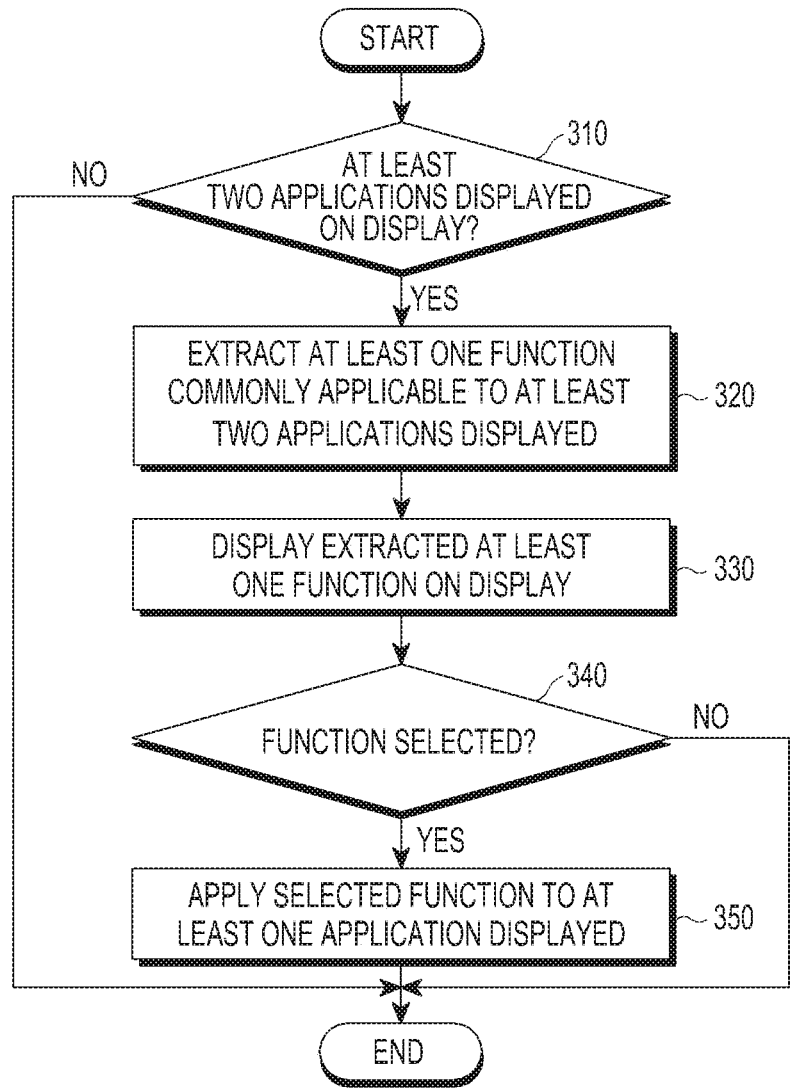
FIG. 3 is a flowchart illustrating a display control operation according to an embodiment of the present disclosure.

FIG. 3 is a flowchart illustrating a display control operation according to an embodiment of the present disclosure.

Referring to FIG. 3, if at least two applications are displayed on the display 120 of the electronic device 101 at operation 310, the electronic device 101 may extract at least one function commonly applicable to the at least two applications displayed at operation 320. The electronic device 101 may analyze the type of the at least applications displayed on the display 120 and determine at least one recommendation function commonly applicable depending on the analyzed type. The electronic device 101 may determine at least one normal function commonly applicable regardless of the type of the at least two applications displayed.

The recommendation function may differ depending on the type of the at least two applications displayed on the display 120. The recommendation function may include at least one of a search function for searching for data depending on the type of the at least two applications displayed, a recommendation function applicable to the at least two applications displayed, and a comparison function for comparing the at least two applications displayed. According to an embodiment of the present disclosure, the recommendation function may include other various functions commonly applicable depending on the type of applications than the above-described functions. For example, if the two applications are ones for searching for data through the Internet, a data searching function may be commonly included in the two applications. The recommendation function may be determined as in the following Table 1:

TABLE 1

| Number of applications | Screen of each application | Function (task) |
| --- | --- | --- |
| First application | First screen | First function |
|  |  | Second function |
|  |  | . . . |
|  |  | Nth function |
|  | Second screen | First function |
|  |  | Second function |
|  |  | . . . |
|  |  | Nth function |
|  | Nth screen | Nth function |
| Second application | First screen | First function |
| . . . | . . . | . . . |
| Nth application | Nth screen | Third function |

As shown in Table 1, since the first function is commonly included in the first application and the second application, the first function may be included as the recommendation function.

According to an embodiment of the present disclosure, each application may include at least one screen, and at least one function may apply to each screen. According to an embodiment of the present disclosure, a function applicable to each application may be determined as the recommendation function, and a function applicable to each screen included in one application may be determined as the recommendation function.

If at least two applications are run on the display 120, the electronic device 101 may compare functions (or tasks) applicable to the applications, respectively, and may set or determine the same function as the recommendation function.

The normal function may include at least one of a capturing function for capturing the displayed applications, a scrolling function for scrolling the displayed applications, a zooming function for adjusting zoom of the displayed applications, and a printing function for printing out the displayed applications. According to an embodiment of the present disclosure, the normal function may include other various functions commonly applicable regardless of the type of applications than the above-described functions.

The electronic device 101 may display at least function on the display 120 at operation 330. The electronic device 101 may generate a window including an icon indicating the at least one recommendation function and an icon indicating the at least one normal function and may display the generated window on the display 120. The position of the window may be freely changed on the display 120 by the user. At least one icon included in the window may be relocated to the left or right by a left or right touch-and-drag. The electronic device 101 may accumulate the count of the function frequently used depending on the type of application and may determine a descending order of the accumulated count the order of recommendation function. The electronic device 101 may apply a visual effect to the window so that the at least one recommendation function is distinguished form the at least one normal function.

If the function is selected in operation 340, the electronic device 101 may apply the selected function to at least one displayed application at operation 350. If any icon included in the window is selected, the electronic device 101 may apply a function designated or corresponding to the selected icon to at least one application displayed on the display 120. The electronic device 101 may apply a function designated or corresponding to the selected icon to at least two applications displayed on the display 120. If a displayed icon is dragged to a first area where a first application of the at least two applications is displayed, the electronic device 101 may apply a function corresponding to the selected icon to the first application. If the displayed icon is touched, the electronic device 101 may commonly apply the function corresponding to the selected icon to the at least two applications. If the displayed icon is dragged to the first area where the first application of the at least two applications is displayed, the electronic device 101 may control the display of the first application according to a function corresponding to the selected icon and display a result of the control on a second area where a second application of the at least two applications is displayed.

The electronic device 101 may display on the second area data corresponding to at least one object included in the controlled first application, corresponding to selection of the at least object.

For example, if the icon having the search function is dragged to the area where the first application is positioned while a received message is displayed on the first application, the electronic device 101 may analyze an object searchable on the first application and provide a visual effect to the analyzed object. If the object (e.g., a person's name) provided with the visual effect is selected, data (e.g., a picture) corresponding to the selected object may be displayed on the second area.

If the selected icon is an icon corresponding to a search function, the electronic device 101 may apply a visual effect to at least one searchable object of a plurality of objects included in the first application. The electronic device 101 may determine the attribute of an object selected from the at least one object and display on the second area data corresponding to the attribute of the object.

For example, if the selected object is a name, the electronic device 101 may display on the second area at least one data item corresponding to the selected name from among the data stored in the electronic device 101. If selecting the object provided with such visual effect, the electronic device 101 may read out data corresponding to the selected object from the storage unit 140 or download the data through another external electronic device (not shown) or the Internet. The electronic device 101 may display such data on the second area.

For example, if the selected object is a web address, the electronic device 101 may display on the second area a web browser accessible to the web address. If the at least two applications are applications for achieving the same purpose, the electronic device 101 may determine an application that displays earlier a result corresponding to the selected icon and apply a visual effect to the determined application.

Figure 4:
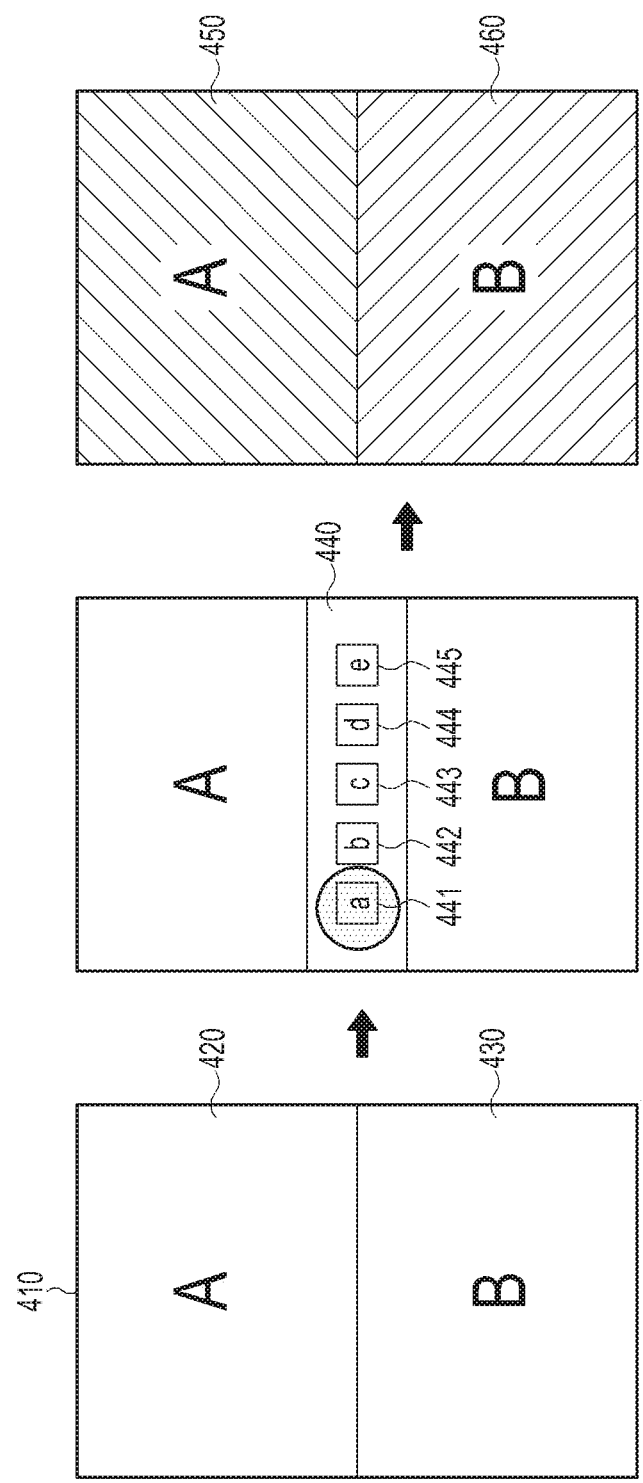
FIG. 4 is a view illustrating an example of applying a function corresponding to a selected function to at least two applications corresponding to the selection of the icon according to an embodiment of the present disclosure.

FIG. 4 is a view illustrating an example of applying a function corresponding to a selected function to at least two applications corresponding to the selection of the icon according to an embodiment of the present disclosure.

Referring to FIG. 4, if two applications 420 and 430 are displayed on the display 410, the electronic device 101 may extract at least one function applicable to at least two applications displayed on the display, display the at least one extracted function with an icon, and apply a function corresponding to the icon to at least one application of the at least two applications, corresponding to the selection of the displayed icon. If the two applications 420 and 430 are displayed on the display 410, the electronic device 101 may display a window 440 including icons 441, 442, 443, 444, and 445 according to at least one function applicable to the two displayed applications. The window may include icons corresponding to functions that may differ depending on the type or purpose of applications. The window may freely change position on the display 120. At least one icon included in the window may be relocated to the left or right by a left or right touch-and-drag. The icons may be determined, arranged, or sorted depending on the number of times of use according to the type or purpose of applications, priority, or functions primarily used on each application. For example, if the first information 441 is selected by a touch or hovering, the electronic device 101 may apply the function to the two applications 420 and 430 and display the applications 450 and 460.

Figure 5A:
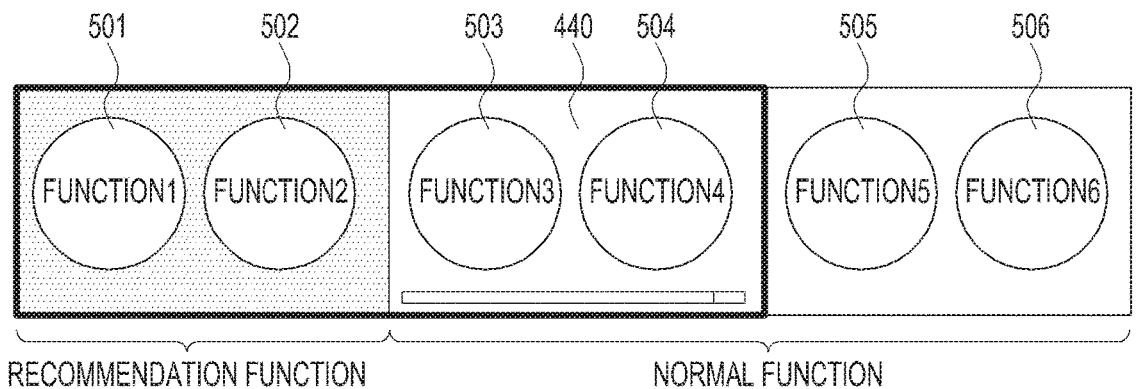
FIG. 5A is a view illustrating an example of a window including at least one icon according to an embodiment of the present disclosure.
Figure 5B:
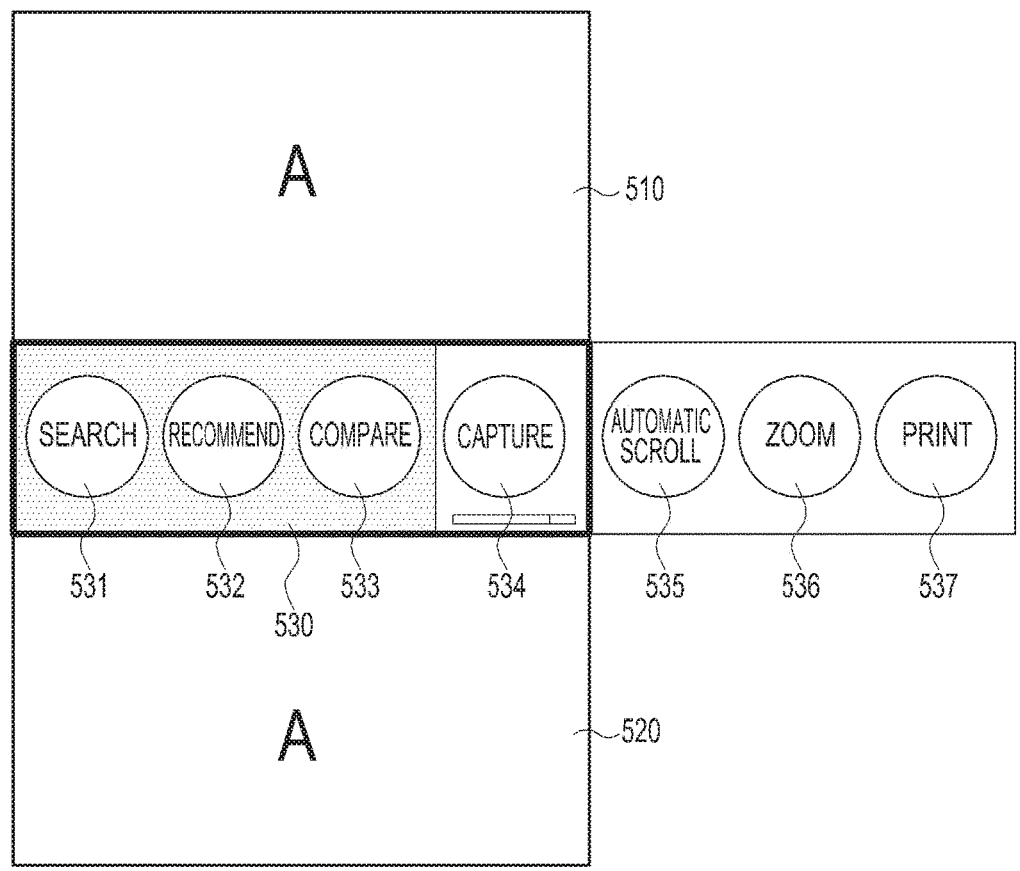
FIG. 5B is a view illustrating an example of a window including at least one icon if two applications are the same according to an embodiment of the present disclosure.
Figure 5C:
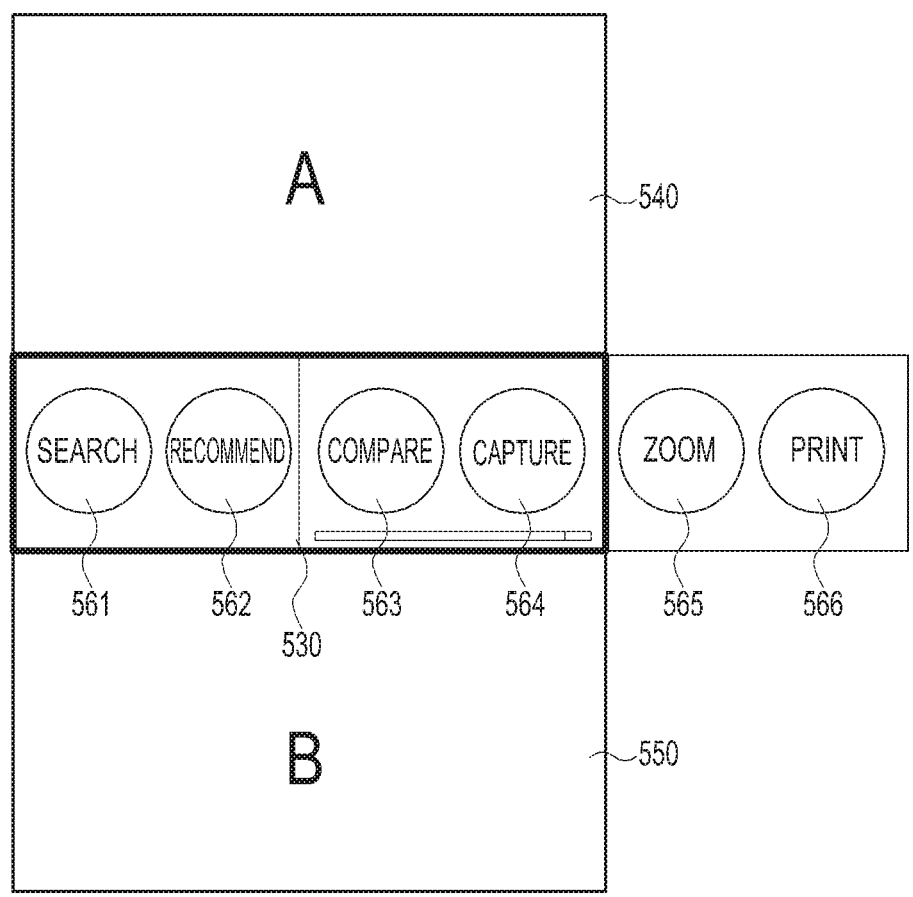
FIG. 5C is a view illustrating an example of a window including at least one icon if two applications are different from each other according to an embodiment of the present disclosure.

FIG. 5A is a view illustrating an example of a window including at least one icon according to an embodiment of the present disclosure. FIG. 5B is a view illustrating an example of a window including at least one icon if two applications are the same according to an embodiment of the present disclosure. FIG. 5C is a view illustrating an example of a window including at least one icon if two applications are different from each other according to an embodiment of the present disclosure.

Referring to FIG. 5A, an example of a window including at least one icon according to an embodiment of the present disclosure is illustrated. The window 440 may include an icon according to a recommendation function commonly applicable to displayed applications and an icon according to a normal function applicable to all the applications regardless of the type or purpose of the displayed applications.

The electronic device 101 may analyze the type of the at least applications displayed and determine at least one recommendation function commonly applicable depending on the analyzed type. The electronic device 101 may determine at least one normal function commonly applicable regardless of the type of the at least two applications displayed. The electronic device 101 may generate a window 440 including icons 501 and 502 indicating the at least one recommendation function and icons 503, 504, 505, and 506 indicating the at least one normal function and may display the generated window on the display 120.

Referring to FIG. 5B, an example of a window including at least one icon if two applications are the same according to an embodiment of the present disclosure is illustrated. If the two applications 510 and 520 displayed on the display are the same application, the electronic device 101 may generate and display a window 530 including icons 531, 532, and 533 according to at least one recommendation function commonly applicable to the two applications 510 and 520 and icons 534, 535, 536, and 537 according to at least one normal function commonly applicable regardless of the type of the two applications 510 and 520.

The recommendation function may include at least one of a search function for searching for data depending on the type of the at least two applications displayed, a recommendation function commonly applicable to the at least two applications displayed, and a comparison function for comparing the at least two applications displayed. According to an embodiment of the present disclosure, the recommendation function may include other various functions commonly applicable depending on the type of applications than the above-described functions. For example, if the two applications are ones having a search function, the search function may be commonly included in the two applications.

The normal function may include at least one of a capturing function for capturing the displayed applications, an automatic scrolling function for scrolling the displayed applications, a zooming function for adjusting zoom of the displayed applications, and a printing function for printing out the displayed applications. According to an embodiment of the present disclosure, the normal function may include other various functions commonly applicable regardless of the type of applications than the above-described functions.

Referring to FIG. 5C, an example of a window including at least one icon if two applications are different from each other is illustrated. If the two applications 540 and 550 displayed on the display are the same application, the electronic device 101 may generate and display a window 530 including icons 561 and 562 according to at least one recommendation function commonly applicable to the two applications 540 and 550 and icons 563, 564, 565, and 566 according to at least one normal function commonly applicable regardless of the type of the two applications 540 and 550.

The recommendation function may include at least one of a search function for searching for data depending on the type of the at least two applications displayed and a recommendation function commonly applicable to the at least two applications displayed. The normal function may include at least one of a capturing function for capturing the displayed applications, an automatic scrolling function for scrolling the displayed applications, a zooming function for adjusting zoom of the displayed applications, and a printing function for printing out the displayed applications.

Figure 6:
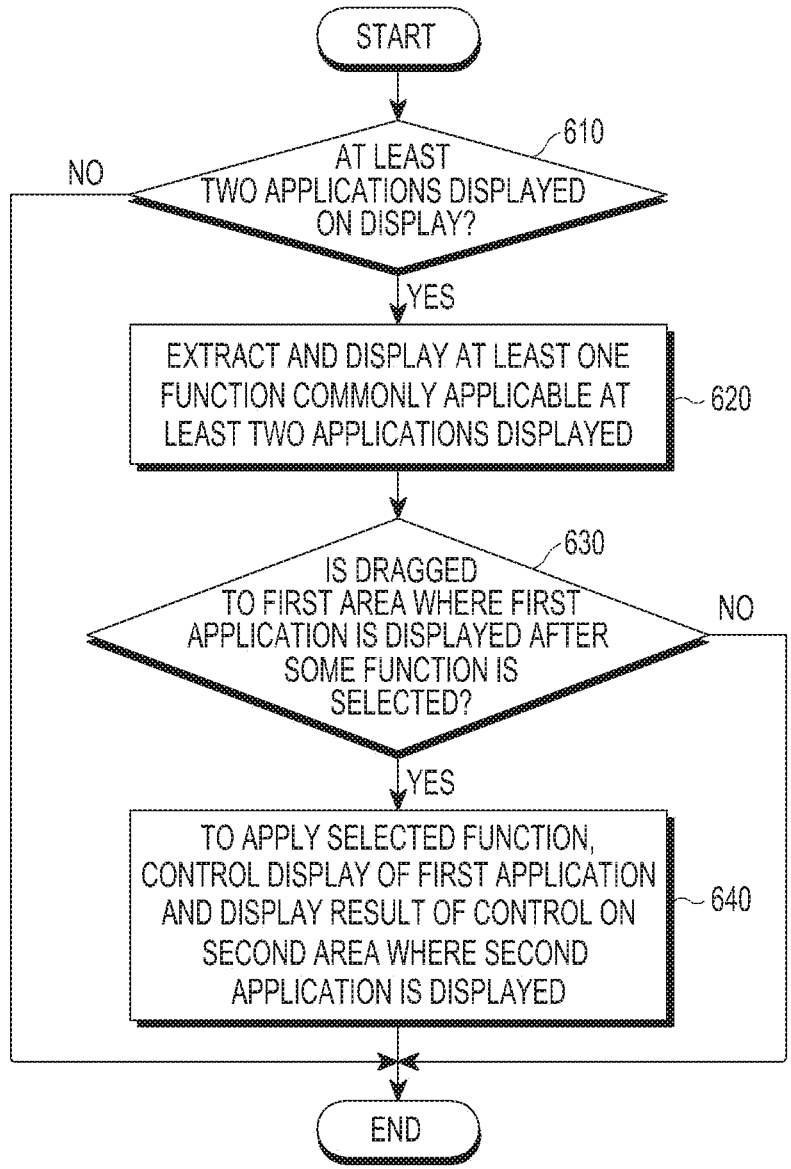
FIG. 6 is a flowchart illustrating a display control operation according to an embodiment of the present disclosure.

FIG. 6 is a flowchart illustrating a display control operation according to an embodiment of the present disclosure.

Referring to FIG. 6, if at least two applications are displayed on the display 120 of the electronic device 101 at operation 610, the electronic device 101 may extract and display at least one function commonly applicable to the at least two applications displayed at operation 620. The electronic device 101 may analyze the type of the at least two applications displayed on the display 120 and determine at least one recommendation function commonly applicable depending on the analyzed type. The electronic device 101 may determine at least one normal function commonly applicable regardless of the type of the at least two applications displayed. The electronic device 101 may display a window including an icon corresponding to the at least one extracted recommendation function and an icon corresponding to the at least one normal function on the display 120. The electronic device 101 may generate a window including an icon indicating the at least one recommendation function and an icon indicating the at least one normal function and may display the generated window on the display 120. The position of the window may be freely changed on the display 120 by the user. At least one icon included in the window may be relocated to the left or right by a left or right touch-and-drag. The electronic device 101 may apply a visual effect to the window so that the at least one recommendation function is distinguished form the at least one normal function.

If an icon corresponding to a function is selected, and the selected icon is dragged to a first area where a first application of the at least two applications is displayed at operation 630, the electronic device 101 may control the display of the first application to apply the selected function and display a result of the control on a second area where a second application is displayed at operation 640. The electronic device 101 may display on the second area data corresponding to at least one object included in the controlled first application, corresponding to selection of the at least object. For example, if the icon having the search function is dragged to the area where the first application is positioned while a received message is displayed on the first application, the electronic device 101 may analyze an object searchable on the first application and provide a visual effect to the analyzed object. If the object (e.g., a person's name) provided with the visual effect is selected, data (e.g., a picture) corresponding to the selected object may be displayed on the second area.

If the selected icon is an icon corresponding to a search function, the electronic device 101 may apply a visual effect to at least one searchable object of a plurality of objects included in the first application. The electronic device 101 may determine the attribute of an object selected from the at least one object and display on the second area data corresponding to the attribute of the object.

For example, if the selected object is a name, the electronic device 101 may display on the second area at least one data item corresponding to the selected name from among the data stored in the electronic device 101. If selecting the object provided with such visual effect, the electronic device 101 may read out data corresponding to the selected object from the storage unit 140 or download the data through another external electronic device (not shown) or the Internet. The electronic device 101 may display such data on the second area.

For example, if the selected object is a web address, the electronic device 101 may display on the second area a web browser accessible to the web address. If the at least two applications are applications for achieving the same purpose, the electronic device 101 may determine an application that displays earlier a result corresponding to the selected icon and apply a visual effect to the determined application.

Figure 7:
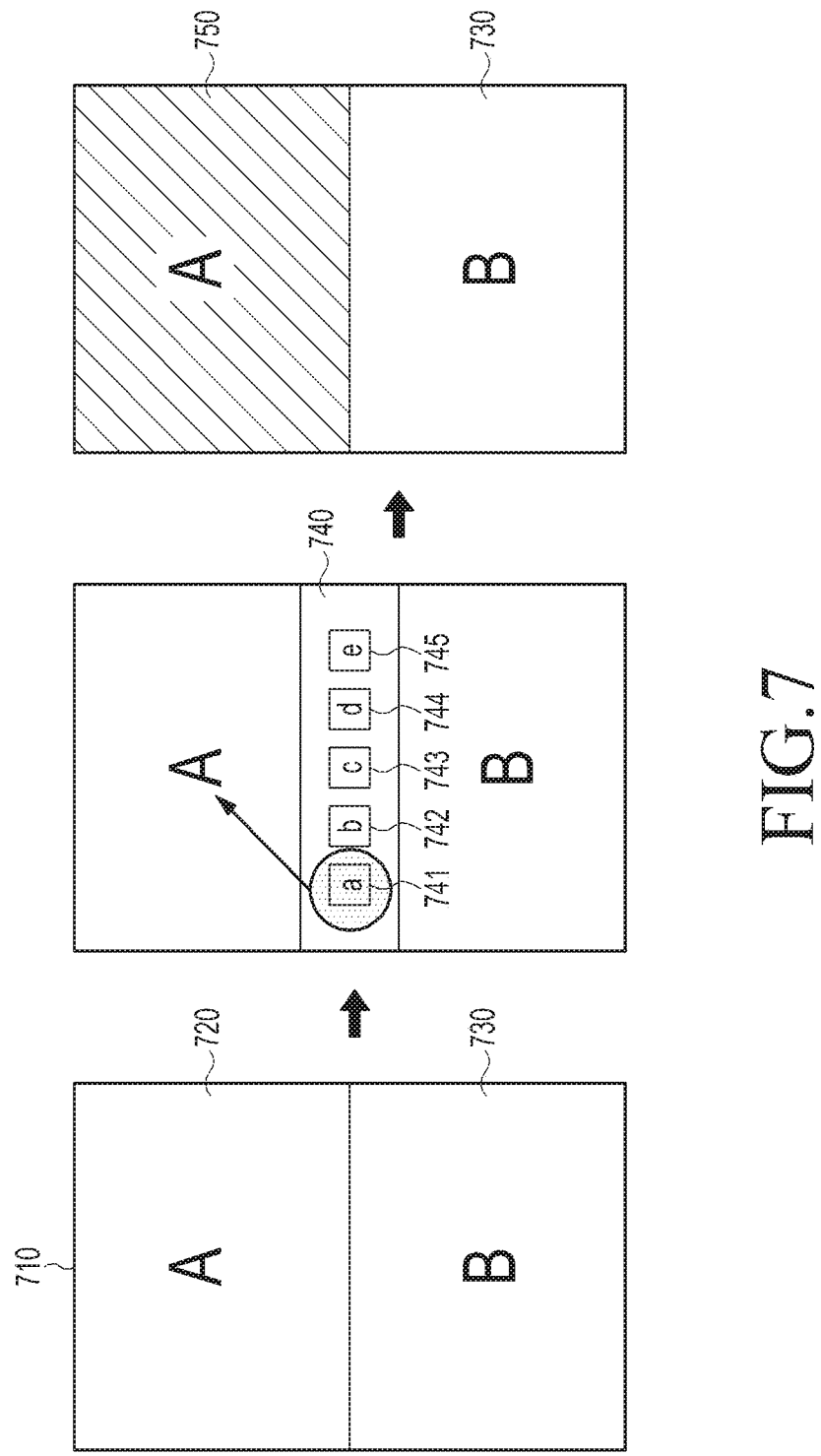
FIG. 7 is a view illustrating an example of applying a function corresponding to a selected function to an application corresponding to the selection of the icon according to an embodiment of the present disclosure.

FIG. 7 is a view illustrating an example of applying a function corresponding to a selected function to an application corresponding to the selection of the icon according to an embodiment of the present disclosure.

Referring to FIG. 7, if two applications 720 and 730 are displayed on the display 710, the electronic device 101 may extract at least one function applicable to at least two applications displayed on the display, display the at least one extracted function with an icon, and apply a function corresponding to the icon to at least one application of the at least two applications, corresponding to the selection of the displayed icon. If the two applications 720 and 730 are displayed on the display 710, the electronic device 101 may display a window 740 including icons 741, 742, 743, 744, and 745 according to at least one function applicable to the two displayed applications. The window may include icons corresponding to functions that may differ depending on the type or purpose of applications. The window may freely change position on the display 120. At least one icon included in the window may be relocated to the left or right by a left or right touch-and-drag. The icons may be determined, arranged, or sorted depending on the number of times of use according to the type or purpose of applications, priority, or functions primarily used on each application. For example, if the first icon 741 is selected and is then dragged to an area where the first application 720 is displayed, the electronic device 101 may apply the selected function to the first application 720 and display the same (750).

Figure 8C:
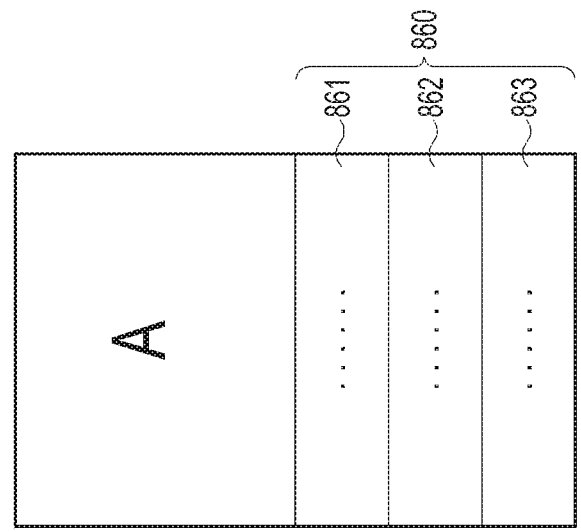
FIG. 8C is a view illustrating an example of displaying data corresponding to an object to a position of a second application if the object is selected according to an embodiment of the present disclosure.
Figure 8B:
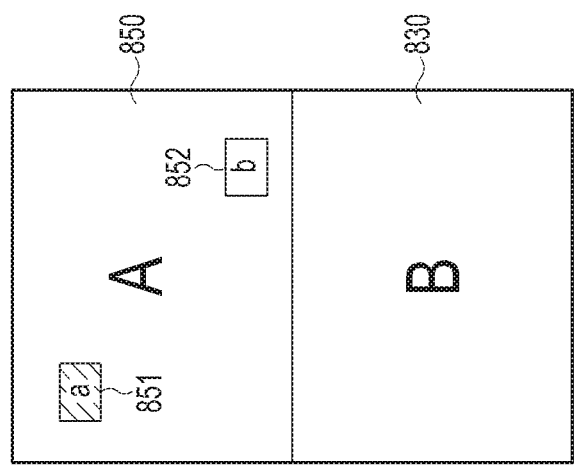
FIG. 8B is a view illustrating an example of applying a visual effect to a plurality of objects in a first application corresponding to an icon if the icon is dragged to the first application according to an embodiment of the present disclosure.
Figure 8A:
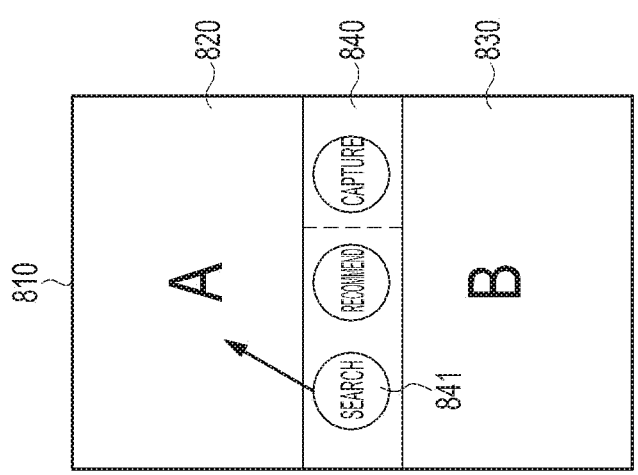
FIG. 8A is a view illustrating an example of displaying a window including a plurality of icons and two applications according to an embodiment of the present disclosure.

FIG. 8A is a view illustrating an example of displaying a window including a plurality of icons and two applications according to an embodiment of the present disclosure. FIG. 8B is a view illustrating an example of applying a visual effect to a plurality of objects in a first application corresponding to an icon if the icon is dragged to the first application according to an embodiment of the present disclosure. FIG. 8C is a view illustrating an example of displaying data corresponding to an object to a position of a second application if the object is selected according to an embodiment of the present disclosure.

Referring to FIGS. 8A to 8C, the electronic device 101 may display on the display 810 a window 840 including two different applications 820 and 830 and an icon corresponding to at least function applicable to the two applications. The window 840 may include icons corresponding to functions that may differ depending on the type or purpose of applications. As shown in FIG. 8A, if an icon 841 corresponding to a search function included in the window 840 is dragged to the area where the first application 820 is displayed, the electronic device 101 may provide a visual effect to at least one object 851 and 852 that may apply the selected function to the first application 820 and control the display of the first application as shown in FIG. 8B. The electronic device 101 may apply a visual effect, e.g., highlighting, to the at least one searchable object 851 and 852 and display the visual effect. If the object 851 is selected, the electronic device 101 may display an application (e.g., a web browser, search website, Youtube™, etc.) capable of searching for the selected object 851 and display at least one search result 861, 862, and 863 for the selected object 851 through the displayed application on the area 860 where the second application 830 is displayed, as shown in FIG. 8C.

Figure 9:
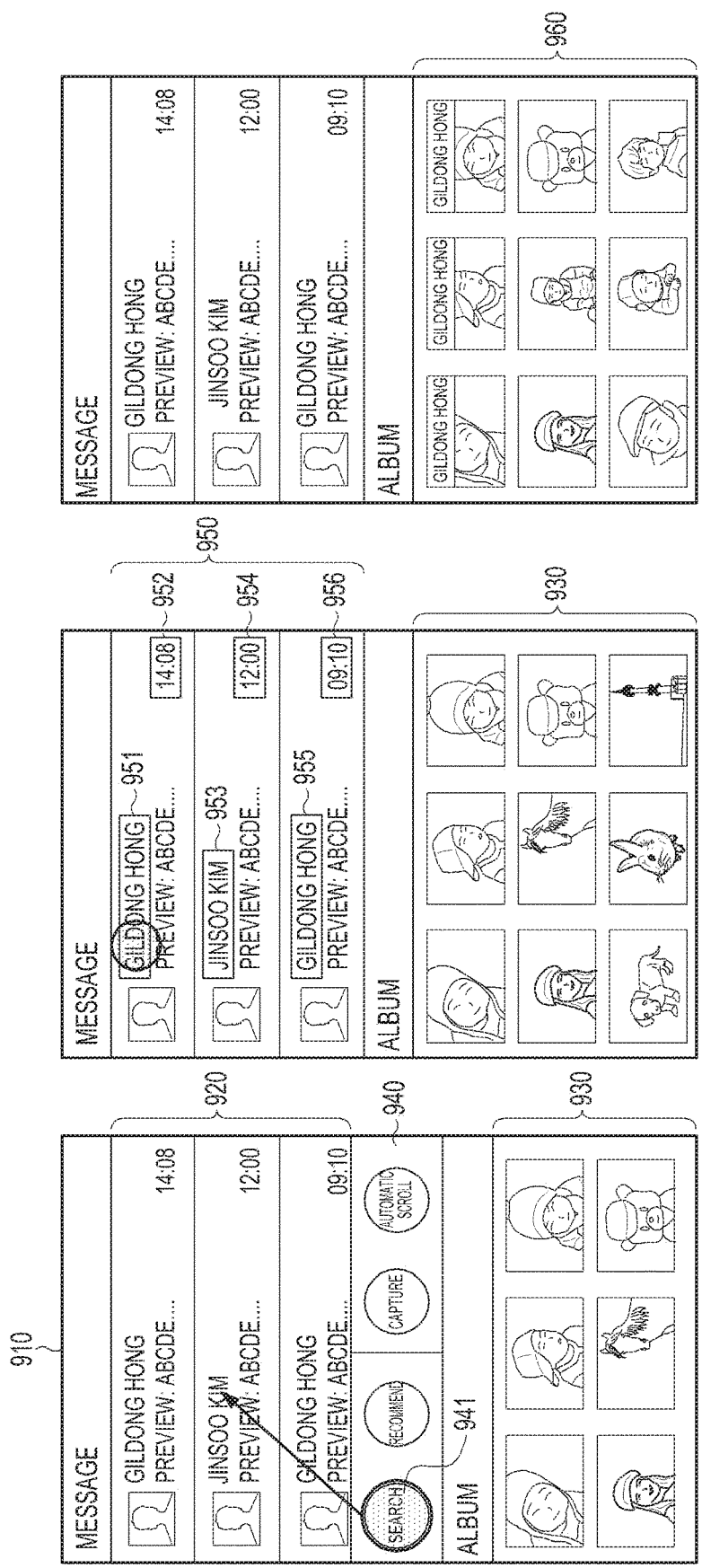
FIG. 9 is a view illustrating an example of displaying a result according to a search function on two applications according to an embodiment of the present disclosure.

FIG. 9 is a view illustrating an example of displaying a result according to a search function on two applications according to an embodiment of the present disclosure.

Referring to FIG. 9, the electronic device 101 may display on the display 910 a window 940 including a first application 920 displaying a received message, a second application 930 displaying at least one image, and at least one function applicable to the two applications 920 and 930. The first application 920 may display the names of the persons from whom text messages have been received thus far, the content of the text messages, and the times of reception of the text messages. The second application 930 may display various data (e.g., pictures or videos) stored in the storage unit 140 of the electronic device 101. The window 840 may include icons according to functions applicable to the first application 920 and the second application 930. If an icon 941 corresponding to a search function included in the window 940 is dragged to the area where the first application 920 is displayed, the electronic device 101 may provide a visual effect to at least one object 951, 952, 953, 954, 955, and 956 that may apply the selected function to the first application 950. The electronic device 101 may apply a visual effect, e.g., highlighting, to the at least one searchable object 951, 952, 953, 954, 955, and 956 and display the visual effect.

If the first object 951 is selected, the electronic device 101 may search for data corresponding to the selected object 951 and display a search result 960. For example, if the first object is a person whose name is "Gildong HONG," the electronic device 101 may search for pictures or videos taken of the person and display search results. Further, the electronic device 101 may search for data whose file name is "Gildong HONG" and display searched data. If the selected object is at least one of objects 952, 954, and 956 corresponding to time, the electronic device 101 may extract, from the storage unit 140, data corresponding to the time of the at least one selected object from the stored data and display the extracted data.

Figure 10:
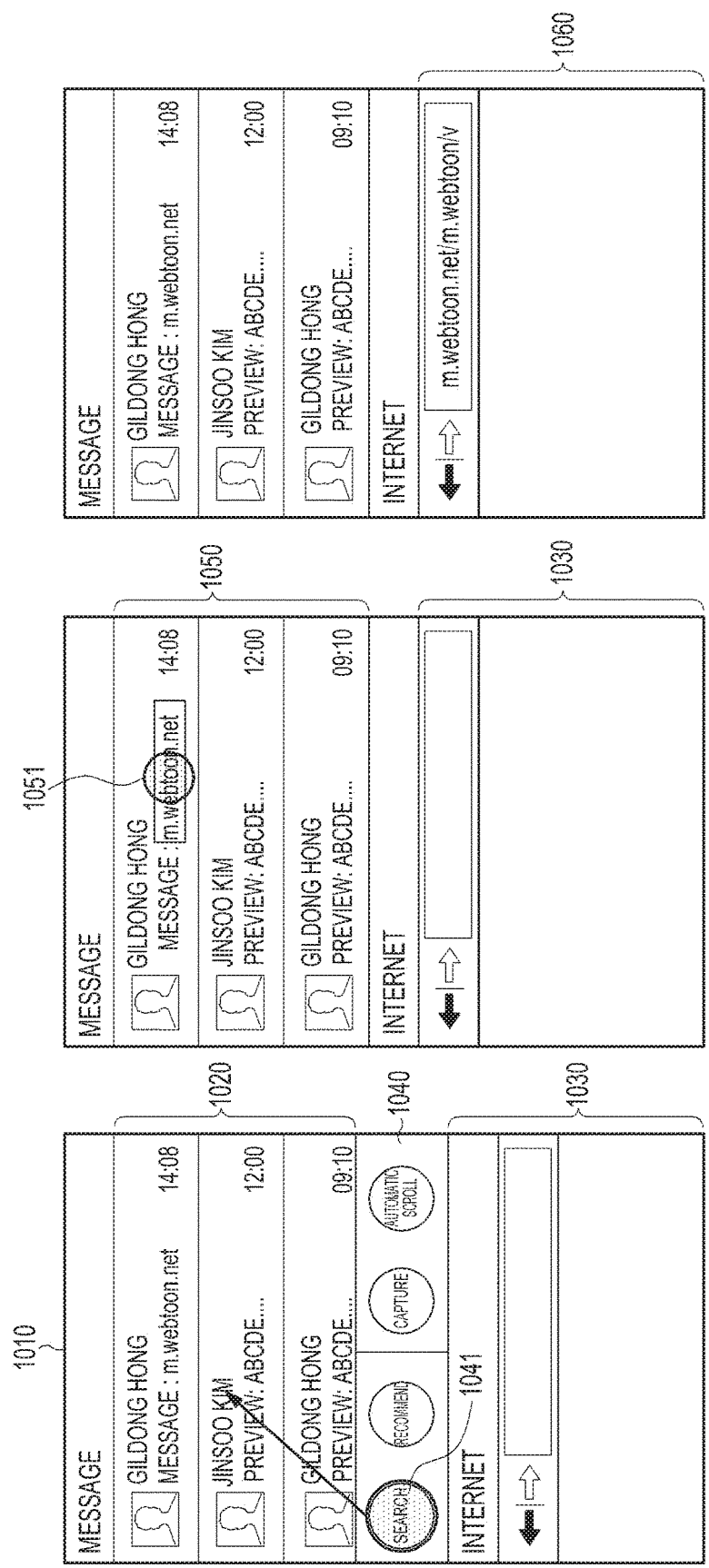
FIG. 10 is a view illustrating an example of displaying a result according to a search function on two applications according to an embodiment of the present disclosure.

FIG. 10 is a view illustrating an example of displaying a result according to a search function on two applications according to an embodiment of the present disclosure.

Referring to FIG. 10, the electronic device 101 may display on the display 1010 a window 1040 including a first application 1020 displaying a received message, a second application 1030 capable of searching for information, and at least one function applicable to the two applications 1020 and 1030. The first application 920 may display the names of the persons from whom text messages have been received thus far, the content of the text messages, and the times of reception of the text messages. The second application 1030 may include a web browser capable of searching for information or a search engine capable of searching for videos or motion pictures. The window 1040 may include icons according to functions applicable to the first application 1020 and the second application 1030. If an icon 1041 corresponding to a search function included in the window 1040 is dragged to the area where the first application 1020 is displayed, the electronic device 101 may provide a visual effect to at least one object that may apply the selected function to the first application 1050. The electronic device 101 may apply a visual effect, e.g., highlighting, to the at least one searchable object and display the same. If the first object 1051 is selected, the electronic device 101 may search for data corresponding to the selected object 1051 and display a search result 1060. For example, if the selected first object 1051 is a web address, the electronic device 101 may access the selected web address using the second application 1030 and display a result of the access. Further, the electronic device 101 may search for data whose file name is "Gildong HONG" and display searched data.

Figure 11:
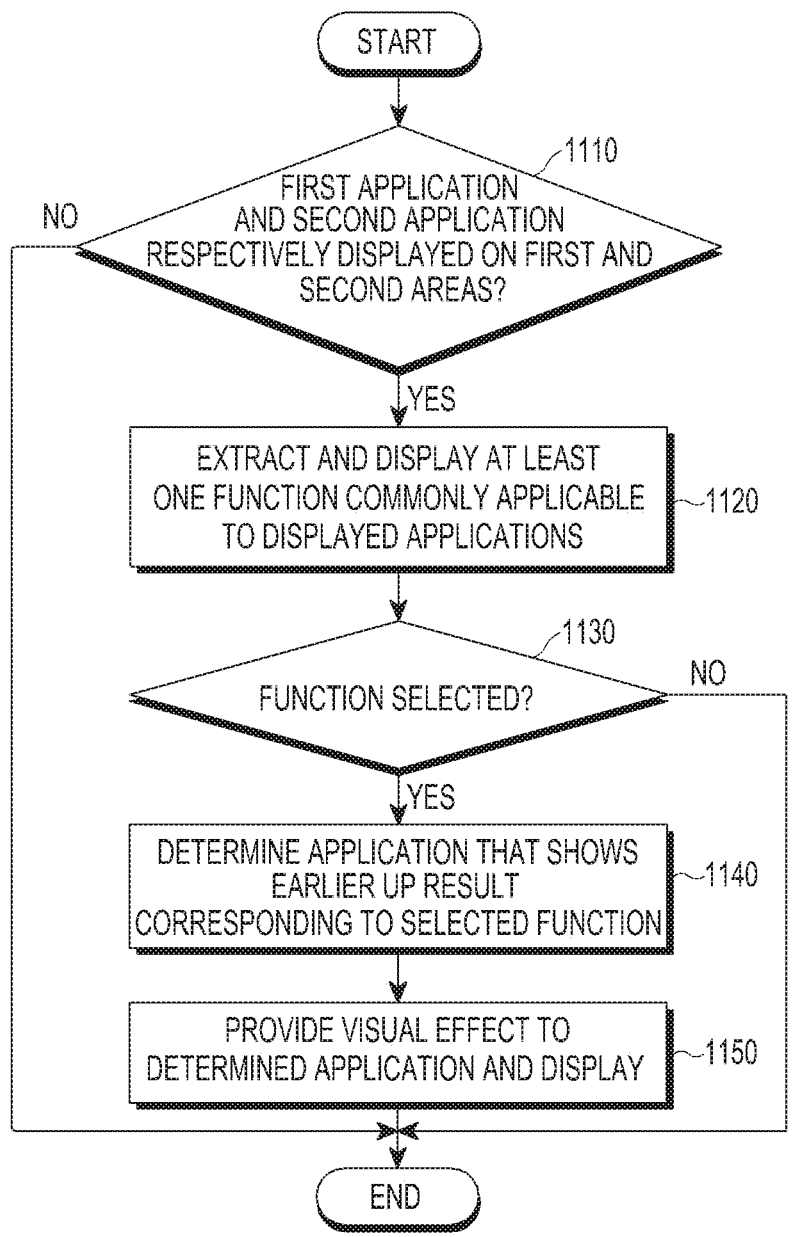
FIG. 11 is a flowchart illustrating a display control operation according to an embodiment of the present disclosure.

FIG. 11 is a flowchart illustrating a display control operation according to an embodiment of the present disclosure.

Referring to FIG. 11, if a first application is displayed on a first area of the display 120, and a second application is displayed on a second area of the display 120 at operation 1110, the electronic device 101 may extract and display at least one function commonly applicable to the displayed applications at operation 1120. If at least two applications of the same type are displayed on the display 120 of the electronic device 101, the electronic device 101 may extract and display at least one function commonly applicable to the at least two applications displayed. The electronic device 101 may analyze the type of the at least two applications displayed on the display 120 and determine at least one recommendation function commonly applicable depending on the analyzed type. The electronic device 101 may determine at least one normal function commonly applicable regardless of the type of the at least two applications displayed. The electronic device 101 may display a window including an icon corresponding to the at least one extracted recommendation function and an icon corresponding to the at least one normal function on the display 120. The electronic device 101 may generate a window including an icon indicating the at least one recommendation function and an icon indicating the at least one normal function and may display the generated window on the display 120.

If a function is selected at operation 1130, the electronic device 101 may determine an application that displays earlier a result corresponding to the selected function at operation 1140. If the at least two applications are applications for achieving the same purpose, the electronic device 101 may determine an application that displays earlier a result corresponding to the selected icon. For example, if the name of a product desired to be purchased is input while at least two Internet shopping mall websites are displayed on the display 120, the electronic device 101 may determine an application that shows earlier up a result corresponding to the inputted product and may apply a visual effect to the determined application. The determination of the application may be made depending on various conditions, including download speed, display speed, type of products, number of products, product price, and reviews on products. According to an embodiment of the present disclosure, the determination of the application may be previously designated by the user. The electronic device 101 may determine an application to which a visual effect is to apply by the priority according to the type or purpose of applications displayed on the display 120. The priority may be designated by the user.

The electronic device 101 may provide a visual effect to the determined application and display the visual effect at operation 1150. For example, if each application is an application capable of searching for a location, if an icon corresponding to a locating function is selected, the electronic device 101 may display a window to receive a location desired to be searched and may receive the location through the displayed window. If a location desired to be searched is input, the electronic device 101 may search for the locations respectively inputted through different applications capable of searching for locations. The electronic device 101 may display results searched by at least two applications capable of searching for locations on the display 120 through the applications, respectively. The electronic device 101 may provide a visual effect to an application that shows up a search result earlier. The visual effect may include enlarging the first application showing the search result as compared with the second application.

FIG. 12A is a view illustrating an example of displaying two applications of the same type according to an embodiment of the present disclosure. FIG. 12B is a view illustrating an example of a screen of receiving information by applications of the same type according to an embodiment of the present disclosure. FIG. 12C is a view illustrating an example of displaying a result searched corresponding to inputted information according to an embodiment of the present disclosure.

Referring to FIGS. 12A to 12C, the electronic device 101 may display on the display 1210 a window 1240 including a first application 1220 and second application 1230 for searching for a location and at least one function applicable to the two applications 1220 and 1230. If an icon 1241 corresponding to a locating function included in the window 1240 is selected, a screen 1250 may be displayed as shown in FIG. 12B, and if a location desired to be searched is input, the electronic device 101 may search for the inputted location through the first and second applications 1220 and 1230. The electronic device 101 may display results searched by two applications capable of searching for locations on the display 120 through the applications, respectively. The electronic device 101 may determine an application that previously brought up the inputted location of the first and second applications 1220 and 1230. The determination of the application may be made depending on various conditions, including download speed or display speed. According to an embodiment of the present disclosure, the determination of the application may be previously designated by the user. The electronic device 101 may provide a visual effect to the first application that shows a search result earlier. The visual effect may include enlarging the first application 1260 showing the search result earlier as compared with the second application. If the result searched through the second application 1270 is rendered over time to show up prior to the result searched through the first application 1260, the electronic device 101 may release the visual effect applied to the first application 1260 and may apply a visual effect to the second application 1270.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

At least a part of the device (e.g., modules or their functions) or method (e.g., operations) may be implemented as instructions stored in a computer-readable storage medium e.g., in the form of a programming module. The instructions, if executed by one or more controller (e.g., a separate processor), may cause the processor to carry out a corresponding function. The computer-readable storage medium may be e.g., the memory. At least a part of the programming module may be implemented (e.g., executed) by e.g., the controller (or a separate processor). At least a part of the programming module may include e.g., a module, program, routine, set of instructions, process, or the like for performing one or more functions.

The computer-readable storage medium may include a hardware device configured to store and perform program instructions (e.g., programming module), such as magnetic media such as hard discs, floppy discs, and magnetic tapes, optical media such as compact disc read only memories (CD-ROMs) and DVDs, magneto-optical media such as floptical disks, ROMs, random access memories (RAMs), flash memories, and/or the like. Examples of the program instructions may include not only machine language codes but also high-level language codes which are executable by various computing means using an interpreter. The aforementioned hardware devices may be configured to operate as one or more software modules to carry out various embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s). According to an embodiment of the present disclosure, there is provided a storage medium storing commands configured to, if executed by at least one processor, enable the at least one processor to perform at least one operation that may include a first command set extracting at least one function applicable to at least two applications displayed on a display, a second command set displaying the extracted at least one function as an icon, and a third command set applying a function corresponding to the displayed icon to at least one application of the at least two applications, corresponding to selection of the displayed icon.

As is apparent from the foregoing description, according to embodiments of the present disclosure, there are provided an electronic device and method for controlling a display, which may lead to the control of a plurality of applications and increased usability of the plurality of applications. The correlation between a plurality of application currently in execution may be analyzed, and a function applicable to an application may be recommended, thereby allowing the electronic device to be efficiently used.

While the present disclosure has been shown and described with reference to various embodiments thereof, it will be understood by those skilled in the art that various changes in form and detail may be made therein without departing from the spirit and scope of the present disclosure defined by the appended claims and their equivalents.

What is claimed is:

1. A method for controlling a display of an electronic device, the method comprising:
    displaying a plurality of execution screens corresponding to a plurality of applications, wherein the plurality of applications are different from each other;
    identifying at least one function executable via the plurality of applications corresponding to the plurality of execution screens displayed on the display;
    displaying at least one icon indicating the identified at least one function respectively;
    receiving an input for selecting a first icon among the at least one icon; and
    executing a first function corresponding to the displayed first icon via at least one application among the plurality of applications, based on selecting the displayed first icon.

2. The method of claim 1, wherein the identifying of the at least one function comprises:
    identifying a type of the plurality of applications displayed; and
    determining at least one recommendation function commonly executable via the plurality of applications according to the identified type.

3. The method of claim 2, wherein the identifying of the at least one function comprises determining at least one normal function commonly executable via the plurality of applications regardless of the type of the plurality of applications displayed.

4. The method of claim 3, wherein the displaying of the at least one icon comprises:
    displaying a window including at least one icon indicating the at least one recommendation function respectively and at least one icon indicating the at least one normal function respectively.

5. The method of claim 4, wherein the at least one recommendation function comprises at least one of:
    a search function for searching for data depending on the type of the plurality of applications displayed,
    a recommendation function executable via the plurality of applications displayed, or
    a comparison function for comparing the plurality of applications displayed.

6. The method of claim 4, wherein the at least one normal function comprises at least one of:
    a capturing function for capturing the displayed plurality of execution screens,
    a scrolling function for scrolling the displayed plurality of execution screens,
    a zooming function for adjusting zoom of the displayed plurality of execution screens, or
    a printing function for printing out the displayed plurality of execution screens.

7. The method of claim 1, further comprising:
    when the displayed first icon is dragged to a first area where a first execution screen of a first application among the plurality of execution screens is displayed, executing the first function corresponding to the selected first icon via the first application.

8. The method of claim 1, further comprising:
    when the displayed icon is touched, commonly executing the first function corresponding to the selected first icon via the at least two plurality of applications.

9. The method of claim 1, further comprising:
    when the displayed first icon is dragged to a first area where a first execution screen of a first application among the plurality of execution screens is displayed:
        controlling display of the first execution screen according to the first function corresponding to the selected first icon; and
        displaying a result of the first function executed via the first application on a second area where a second execution screen of a second application among the plurality of execution screens is displayed.

10. The method of claim 9, wherein the displaying of the result on the second area comprises:
    based on selecting an object included in the first execution screen, displaying, on the second area, data corresponding to the object.

11. The method of claim 9, wherein the controlling of the display of the first execution screen comprises:
    when the first icon is an icon indicating a search function, applying a visual effect to at least one searchable object among a plurality of objects included in the first execution screen.

12. The method of claim 11, wherein the displaying of the result on the second area comprises:
    determining an attribute of an object selected from the at least one searchable object; and
    displaying data corresponding to the attribute of the selected object on the second area.

13. The method of claim 12, wherein the displaying of the data corresponding to the attribute of the selected object on the second area further comprises:
    when the selected object is a name, displaying at least one data corresponding to the name selected from a plurality of data stored in the electronic device on the second area.

14. The method of claim 12, wherein the displaying of the data corresponding to the attribute of the selected object on the second area further comprises:
    when the selected object is a web address, displaying a third execution screen of a web browser corresponding to the web address on the second area.

15. The method of claim 1, further comprising:
    determining a first application to display a result corresponding to the first function earlier than other applications among the plurality of applications; and
    providing a visual effect to the determined first application.

16. The method of claim 15, wherein the first application is determined based on a preset priority.

17. An electronic device for controlling a display, the electronic device comprising:
    a display; and
    a controller configured to:

display a plurality of execution screens corresponding to a plurality of applications, wherein the plurality of applications are different from each other, identify at least one function executable via the plurality of applications corresponding to the plurality of execution screens displayed, display at least one icon indicating the identified at least one function respectively on the display, receive an input for selecting a first icon among the at least one icon, and execute a first function corresponding to the displayed first icon via at least one application among the plurality of applications, based on selecting the displayed first icon.

18. The electronic device of claim 17, wherein the controller is further configured to:

identify a type of the plurality of applications displayed; and determine at least one recommendation function commonly executable via the plurality of applications according to the identified type.

19. The electronic device of claim 18, wherein the at least one recommendation function comprises at least one of:

a search function for searching for data depending on the type of the plurality of applications displayed, a recommendation function executable via the plurality of applications displayed, or a comparison function for comparing the plurality of applications displayed.

20. The electronic device of claim 18, wherein the controller is further configured to determine at least one normal function commonly executable via the plurality of applications regardless of the type of the plurality of applications displayed.

21. The electronic device of claim 20, wherein the controller is further configured to:

display a window including at least one icon indicating the at least one recommendation function respectively and at least one icon indicating the at least one normal function respectively.

22. The electronic device of claim 20, wherein the at least one normal function comprises at least one of:

a capturing function for capturing the displayed plurality of execution screens, a scrolling function for scrolling the displayed plurality of execution screens, a zooming function for adjusting zoom of the displayed plurality of execution screens, or a printing function for printing out the displayed plurality of execution screens.

23. The electronic device of claim 17, wherein the controller is further configured to execute, when the displayed first icon is dragged to a first area where a first execution screen of a first application among the plurality of execution screens is displayed, the first function corresponding to the selected first icon via the first application.

24. The electronic device of claim 17, wherein the controller is further configured to commonly execute, when the displayed first icon is touched, the first function corresponding to the selected first icon via the plurality of applications.

25. The electronic device of claim 17, wherein the controller is further configured to, when the displayed first icon is dragged to a first area where a first execution screen of a first application among the plurality of execution screens is displayed:

control display of the first execution screen according to the first function corresponding to the selected first icon; and display a result of the first function executed via the first application on a second area where a second execution screen of a second application among the plurality of applications is displayed.

26. The electronic device of claim 25, wherein the controller is further configured to, based on selecting an object included in the first execution screen, display, on the second area, data corresponding to the object.

27. The electronic device of claim 25, wherein the controller is further configured to apply, when the first icon is an icon indicating a search function, a visual effect to at least one searchable object among a plurality of objects included in the first execution screen.

28. The electronic device of claim 27, wherein the controller is further configured to:

determine an attribute of an object selected from the at least one searchable object; and display data corresponding to the selected object on the second area.

29. The electronic device of claim 28, wherein the controller is further configured to display, when the selected object is a name, at least one data corresponding to the name selected from a plurality of data stored in the electronic device on the second area.

30. The electronic device of claim 28, wherein the controller is further configured to display, when the selected object is a web address, a third execution screen of a web browser corresponding to the web address on the second area.

31. The electronic device of claim 17, wherein the controller is further configured to:

determine a first application to display a result corresponding to the first function earlier than other applications among the plurality of applications; and provide a visual effect to the determined first application.

32. The electronic device of claim 31, wherein the controller is further configured to determine the first application based on a preset priority.

33. The electronic device of claim 17, wherein the controller is further configured to display a display area of the display to be split according to a number of the plurality of applications displayed on the display.

34. A non-transitory computer-readable storage medium storing a program including a command to control a display of an electronic device, the program including instructions to perform a method comprising:

displaying a plurality of execution screens corresponding to a plurality of applications on the display, wherein the plurality of applications are different from each other;

identifying at least one function executable via the plurality of applications corresponding to the plurality of execution screens displayed on the display;

displaying at least one icon indicating the identified at least one function respectively;

receiving an input for selecting a first icon among the at least one icon; and executing a first function corresponding to the displayed first icon via at least one application among the plurality of applications, based on selecting of the displayed first icon.

* * * * *